(12) United States Patent
Schlichter et al.

(10) Patent No.: US 9,744,486 B2
(45) Date of Patent: Aug. 29, 2017

(54) FILTER DEVICE

(75) Inventors: Bernhard Schlichter, Saarbrücken (DE); Ralf Wnuk, Kleinottweiler (DE); Christian Gessner, St. Wendel (DE); Albert Kaints, Spiesen-Elversberg (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 629 days.

(21) Appl. No.: 13/261,812

(22) PCT Filed: Aug. 22, 2012

(86) PCT No.: PCT/EP2012/003547
§ 371 (c)(1),
(2), (4) Date: Feb. 11, 2014

(87) PCT Pub. No.: WO2013/029761
PCT Pub. Date: Mar. 7, 2013

(65) Prior Publication Data
US 2014/0183110 A1 Jul. 3, 2014

(30) Foreign Application Priority Data
Aug. 30, 2011 (DE) .......................... 10 2011 111 457

(51) Int. Cl.
*B01D 24/46* (2006.01)
*B01D 29/68* (2006.01)
(Continued)

(52) U.S. Cl.
CPC ............ *B01D 29/68* (2013.01); *B01D 29/117* (2013.01); *B01D 29/52* (2013.01); *B01D 29/668* (2013.01); *B01D 35/12* (2013.01)

(58) Field of Classification Search
None
See application file for complete search history.

(56) References Cited

U.S. PATENT DOCUMENTS 3,623,607 A * 11/1971 Loos .................... B01D 29/114
                                                    210/106
3,675,775 A *  7/1972 Obidniak ............... B01D 35/12
                                                    210/138
(Continued)

FOREIGN PATENT DOCUMENTS

DE   10 2009 031358 A1   1/2011
EP        0 656 223 A1   6/1995
EP        2 207 609 B1   3/2011

*Primary Examiner* — Richard Gurtowski
(74) *Attorney, Agent, or Firm* — Wenderoth, Lind & Ponack, L.L.P.

(57) ABSTRACT

A filter device has filter elements (23) received in a filter housing (1) with a filter inlet (19) and a filter outlet (21). Flow passes through the filter elements (23) for a filtration or backwash in both directions. At least one filter element (23) performs the filtration. At least one other filter element (23), for cleaning off its active filter surface, can be backwashed by a backwash appliance. For supporting the backwashing, the appliance contains a pressure control (43) having a pressure control element (45). During a backwash operation, the fluid flow is controllable in a fluid connection between filter inlet (19) and the filter element (23) that is to be cleaned off. The fluid connection has a connection space (29) having element openings (27), each of which can be connected to an open end of the filter cavity forming the unfiltered side of each filter element (23). A fluid pathway (27) is provided via which, during the filtration, unfiltrate flows into the connection space (29). By the pressure control element (45), the flow of unfiltrate through the element opening (27) associated with the filter element (23) that is to be cleaned off can be controlled.

8 Claims, 7 Drawing Sheets

(51) Int. Cl.
*B01D 35/12* (2006.01)
*B01D 29/11* (2006.01)
*B01D 29/52* (2006.01)
*B01D 29/66* (2006.01)

(56) References Cited

U.S. PATENT DOCUMENTS

| | | | | |
|---|---|---|---|---|
| 4,119,540 A | * | 10/1978 | Muller | B01D 29/117 |
| | | | | 210/142 |
| 4,210,538 A | * | 7/1980 | Tantillo | B01D 29/15 |
| | | | | 210/333.1 |

* cited by examiner

FILTER DEVICE

FIELD OF THE INVENTION

The invention relates to a filter device having a plurality of filter elements received in a filter housing with a filter inlet for a fluid that is to be filtered and a filter outlet for the filtered fluid. Flow can pass through the filter elements in both directions for filtration or backwash. At the same time, at least one filter element performs the filtration, and at least one other filter element for cleaning off the active filter surface thereof can be backwashed by a backwasher. The backwasher includes a pressure control for supporting the backwashing, which pressure control has a pressure control element, by which the fluid flow in a fluid connection between filter inlet and the filter element that is to be cleaned off can be controlled during a backwash operation.

BACKGROUND OF THE INVENTION

A filter device of this type is disclosed in EP 2 207 609 B1. In the known apparatus, conically shaped filter elements are provided, in particular in the form of slotted screen pipe elements. Due to the conical design, the spacing between the individual slotted screen pipe elements is increased in regions, as a result of which the volute in the filter housing is also enlarged. In the case of backwashing, the conical filter element has a clear advantage over a cylindrical filter element. One reason for this advantage is the relatively larger outlet cross section of the filter elements at the lower end, as compared to cylindrical filter elements having the same filter surface, because the larger outlet cross-section at the lower end facilitates the discharge of contamination with the backwash fluid. The pressure control element of the pressure control mechanism controls a flow of unfiltrate to the backwashing filter element to support the backwash and is allocated to the upper, open end of the relevant filter element. Due to the conical filter element shape, the upper open end has a smaller opening cross section.

Accordingly, in the known apparatus, the filter inlet for the supply of the unfiltrate is located above the filter elements. During filtration, the unfiltrate flows into the filter cavities by the openings that have the smaller opening cross section, which flow is not optimal in terms of flow resistance.

SUMMARY OF THE INVENTION

An object of the invention is to provide an improved filter device characterized by improved flow characteristics during operation.

This object is basically achieved according to the invention by a filter device having, as an essential feature of the invention, a fluid connection between the filter inlet of the filter housing and the respective filter element that is to be cleaned off. The fluid connection has a connecting chamber having element openings. Each filter element opening can be connected to an open end of the filter cavity, forming the unfiltered side of each filter element in that a fluid pathway is provided, by which unfiltrate flows into the connecting chamber during filtration. The flow of unfiltrate through the element opening associated with the filter element that is to be cleaned off can be controlled by the pressure control element such that, as is also the case in the known apparatus, a suction effect that aids the backwash is generated on the unfiltered side of the filter element that is to be cleaned off. Since, to this end, the unfiltrate does not pass to the upper end of the filter cavities having the relatively smaller opening cross-section, due to a direct connection of the filter inlet of the filter housing. Rather, from the connecting chamber, the element openings are connected to the unfiltered sides of the filter elements, eliminating the need to dispose the filter inlet of the housing in such a way that the flow of unfiltrate passes through the opening of the smaller cross-section into the filter cavities during filtering. Thus, the filter inlet can be disposed such that the lower openings having the larger cross section form the fluid inlets for the filtration, whereby improved flow conditions with reduced flow resistance are achieved.

Particularly advantageously for the improved rinsing performance within the context of the respective backwashing operation, a tangential flow (cross flow) is applied from top to bottom in the element that is to be backwashed with a very high flow rate. This flow leads to significant cleaning results in the manner of a bypass connection. Through the pressure control, closing an element opening leads to a kind of pressure surge in the system and any particulate contamination remaining in the element will be removed in a pulsed manner from the element by the pressure surge. Overall, a kind of free jet effect is on the filter surface that is to be cleaned off. Thus, viewed in a tangential direction, a kind of shear layer with suction is provided.

The apparatus according to the invention is especially suitable for ballast water systems of ships to avoid the unwanted entry of foreign microorganisms, plants, etc. in waters in which these species are not indigenous. In conventional automatic filters, the differential pressure $\Delta p$ between the filtrate side and the backwash line of the apparatus determines the cleaning result and to that extent is limited thereby. With the solution according to the invention having a pressure control mechanism, this limitation is not the case, since higher differential pressures in $\Delta p$ can be reliably controlled. Due to the connecting chamber, a large quantity of fluid for tangential flushing is available in the first rinsing phase and likewise improves the cleaning performance of the apparatus.

Compared to conventional systems having backwashing with additionally high levels of contaminate ingress, the elements can no longer become blocked, then requiring regular manual washing. When using the pressure control mechanism, pulsed cleaning is always sufficient to control increased contamination and to successfully clean the element. The solution according to the invention is also able to handle very long backwashing, as is common in ships. Ideally, the filter elements are cleaned with very low filtrate pressures. The respective apparatus can be constructed out of individual, standardized components, which in this respect leads to a modular system that can be easily adapted to the respective application.

Since the filter cavity of the filter elements forms the unfiltered side during filtration, the open ends of the filter cavities forming the unfiltered side and the element openings of the connecting chamber can form parts of the fluid pathway for the inflow of unfiltrate into the connecting chamber.

In modified embodiments, the fluid pathway can have a bypass line, which connects the filter inlet with the connecting chamber. In addition, a pump can be provided. The pump boosts the inflow of unfiltrate in the bypass line. The inflow can be controlled if needed in such a way that, when initiating backwashing, a flow of unfiltrate of appropriate intensity is provided.

In advantageous embodiments, each element opening of the connecting chamber is assigned to a separate pressure control element.

Alternatively, a pressure control element that is jointly assigned to the element openings can be provided. The pressure control element can be moved by means of a displacement mechanism or displacer in operative connection with the element opening of the respective filter element that is to be backwashed.

In especially advantageous embodiments, the respective pressure control element is a pneumatically actuated cut-off valve. Advantageously for the operation of the filter device, a compressed air supply can be used such as is frequently installed in the facilities or buildings in which filter devices of this kind are frequently used.

In especially advantageous embodiments, the filter elements, in the manner of filter cartridges, in particular in the form of slotted screen pipe elements, are disposed vertically in the filter housing. The upper, open end of the filter cavity of each pipe element forms the unfiltered side and is connected to the element openings of the connecting chamber during the filtering. The filter elements adjoin an inflow space at the open, lower ends of their filtering hollow chamber, into which the filter input of the filter housing opens for the supply of unfiltrate. During the filtering process, the lower opening of the filter elements, having the larger cross-section thereby, forms the inlet opening for the unfiltrate that flows from the inflow space of the filter housing, while the lower opening of the respective filter element that is to be backwashed forms the outlet opening for discharging the contaminate-laden backwash fluid. In an alternative embodiment, at least one bypass line can also connect the inflow space with the connecting chamber in a fluid-conducting manner, preferably in a parallel construction to the filter cartridges.

For a backwash operation, the open, lower end of the filter cavity of the respective filter element that is to be cleaned off can be connected to a backwash line. By the backwash line, fluid contaminated during backwashing is discharged. The backwash line can be optionally blocked and released by a valve.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

The filter device shown in FIGS. 1 to 5 has a cylindrical filter housing 1 having a body 3, an upper cover part 5 and a lower housing closure 7. An intermediate bottom 9 is located between this housing closure and the body 3. A cover plate 11 extends between the housing body 3 and the cover part 5. As the Figures show, these parts are flanged with one another by flange connections 13. The intermediate bottom 9 separates the inner space 15 located in the body 3, which inner space forms the clean side of the filtrate space, from the inflow space 17 inside the housing closure 7, into which the unfiltrate can flow by a filter inlet 19. The filter outlet 21 provided for the delivery of filtrate from the filtrate space 15 is located in the central area of the housing body 3.

The intermediate bottom 9 forms the element receptacle for filter elements 23 in the manner of filter cartridges. In the present example, these filter elements are conical slotted screen pipe elements. The lower ends of the pipe elements have a greater diameter and are accommodated on the intermediate bottom 9 that serves as an element receptacle such that the inner filter cavities of the filter elements 23 are connected to the inflow space 17 in the housing closure 7, and thus, with the unfiltrate space, by through passages 25 in the intermediate bottom 9. The filter elements 23 are disposed at spacings from one another along an arc that is concentric to the central axis of the filter housing 1. In an embodiment according to the illustration in FIG. 6, filter elements can also be disposed in groups along a plurality of arcs.

The upper, open ends of the filter elements 23, which upper ends are opposite the intermediate bottom 9, are connected to element openings 27. Element openings 27 are formed in the cover plate 11 and form openings of a connecting chamber 29 located between the cover plate 11 and cover part 5. As can be seen most clearly in FIG. 2, this connecting chamber 29 forms an overflow duct and connects the filter cavities of the filter elements 23 with one another by the element openings 27. Since, during the filtration, the filter cavities are connected to the filter inlet 19 for unfiltrate by the inflow space 17, the connecting chamber 29 forms an unfiltrate space.

Figure 1:
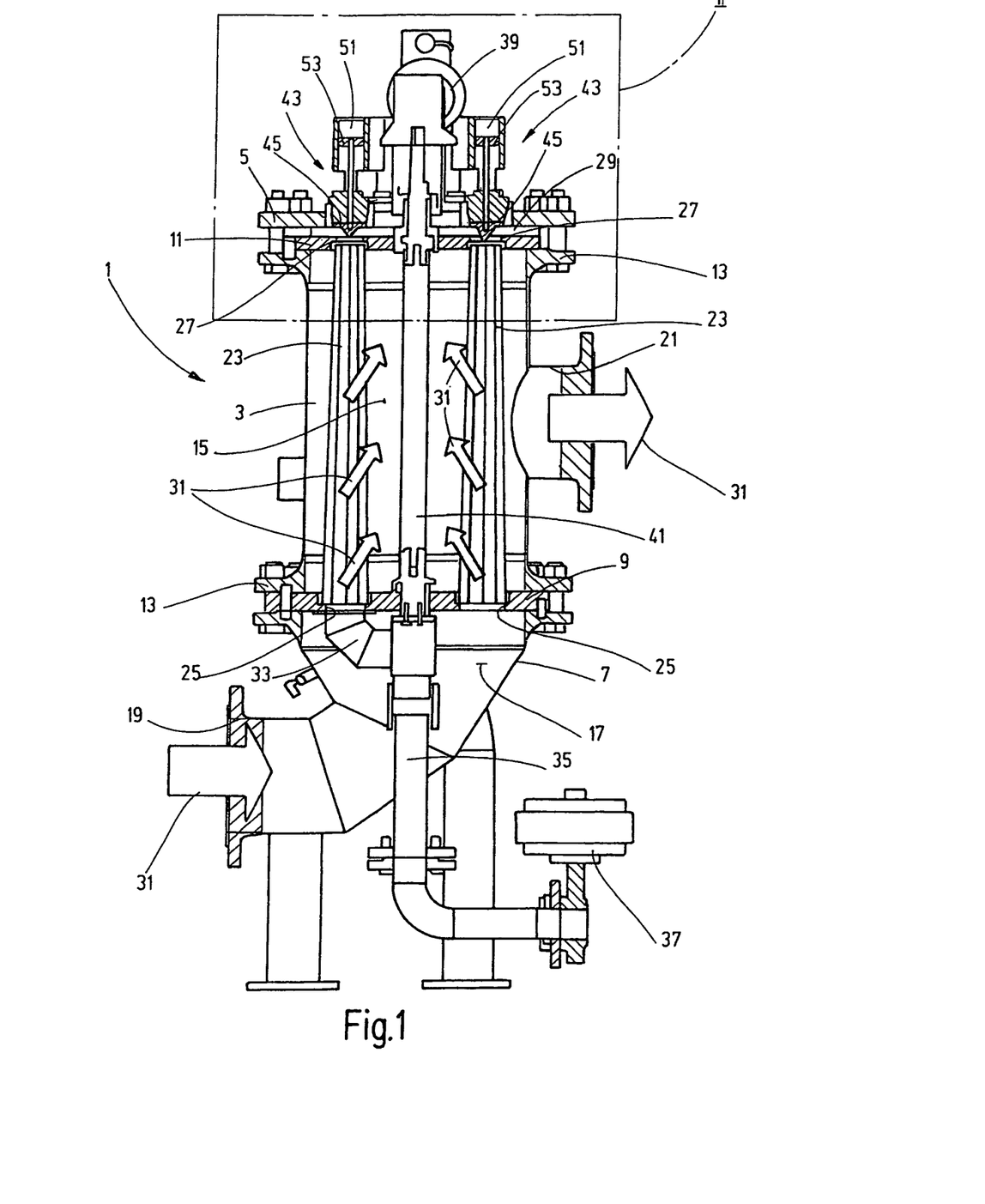
FIG. 1 is a schematic side view in section, not to scale, of a filter device according to an exemplary embodiment of the invention.
Figure 2:
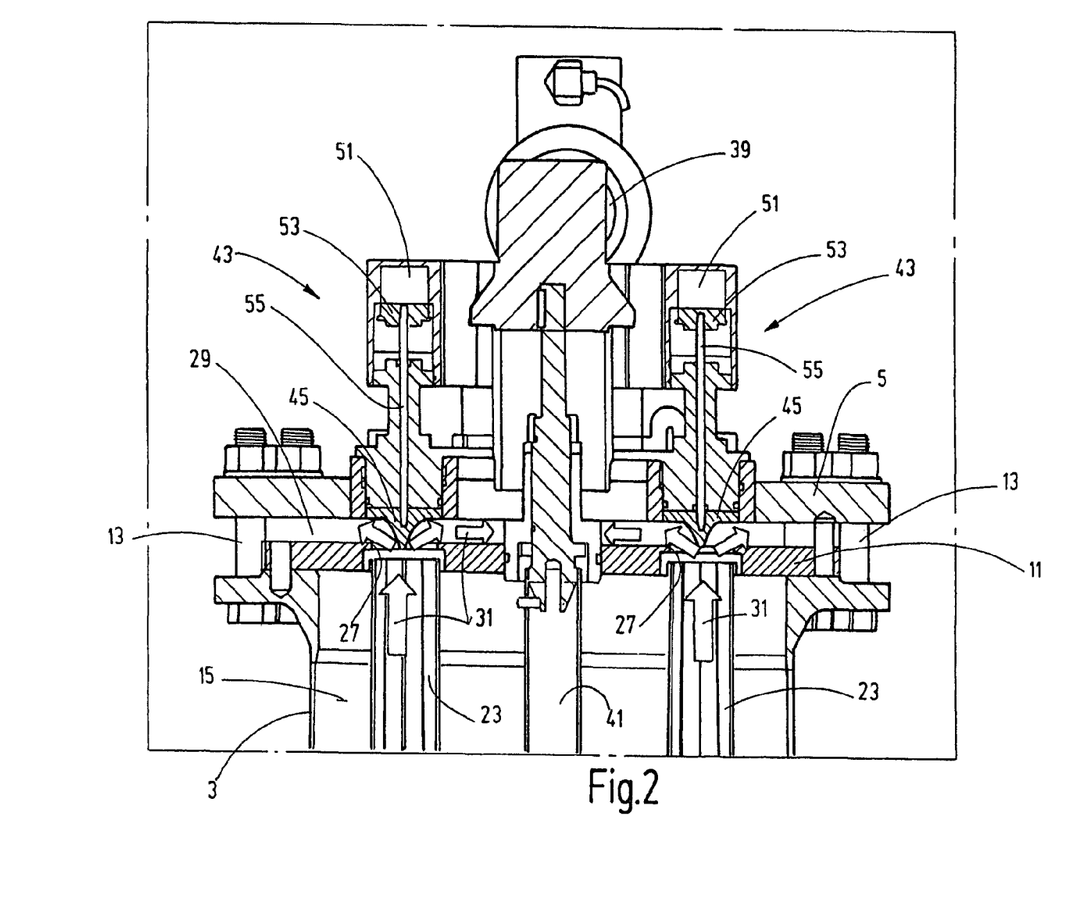
FIG. 2 is an enlarged, partial side view in section of the filter device of FIG. 1, in the region designated as II in FIG. 1.

The flow pattern when the filtration is in operation is indicated in FIGS. 1 and 2 with flow arrows 31, which arrows are not all numbered. Infiltrate flows into the inner filter cavities of the filter elements 23 via the through passages 25 on the intermediate bottom 9, flows through the filter elements 23 from inside to the outside to the filtrate space 15, and then exits through the filter outlet 21. To perform the backwash on a filter element 23 that is to be cleaned off, a movable backwash arm 33, which is connected to a backwash line 35 that leads outward, is connected to the through passage 25 of the filter element 23 selected for cleaning. The backwash line 35 can be selectively shut and released by a valve mechanism or valve 37. To move the backwash arm 33 into an appropriate backwash position, a drive device is provided. By the drive device, the backwash arm 33 can be pivoted in an arc according to the arrangement of the filter element 23. The drive mechanism has a drive motor 39 disposed on the cover part 5 and drives the backwash arm 33 by a drive shaft device 41 disposed coaxially in the filter housing 1.

To facilitate the backwash operation, the backwash mechanism or backwasher has a pressure control mechanism or pressure control, which generates a suction effect within the filter cavity forming the unfiltered side of the filter element 23 that is to be cleaned off by a pressure control element. This cleaning is done in such a way that the backwash arm 33 is aligned with the filter element 23 that is to be cleaned. In the illustration in the Figures, the left side of each filter element 23 that is visible. After the backwash line 35 is released by opening the valve 37, a flow of unfiltrate develops in the selected filter element 23 as a result of the overflow effect of the connecting chamber 29. The unfiltrate from connecting chamber 29 flows from the upper element opening 27, through the through passage 25 in the intermediate bottom 9, to the backwash arm 33. By the movable pressure control element of the pressure control mechanism, the flow rate is now slowed by controlling the aperture at the corresponding element opening 27 in such a way that a hydrodynamic suction effect is generated in the filter cavity.

Figure 3:
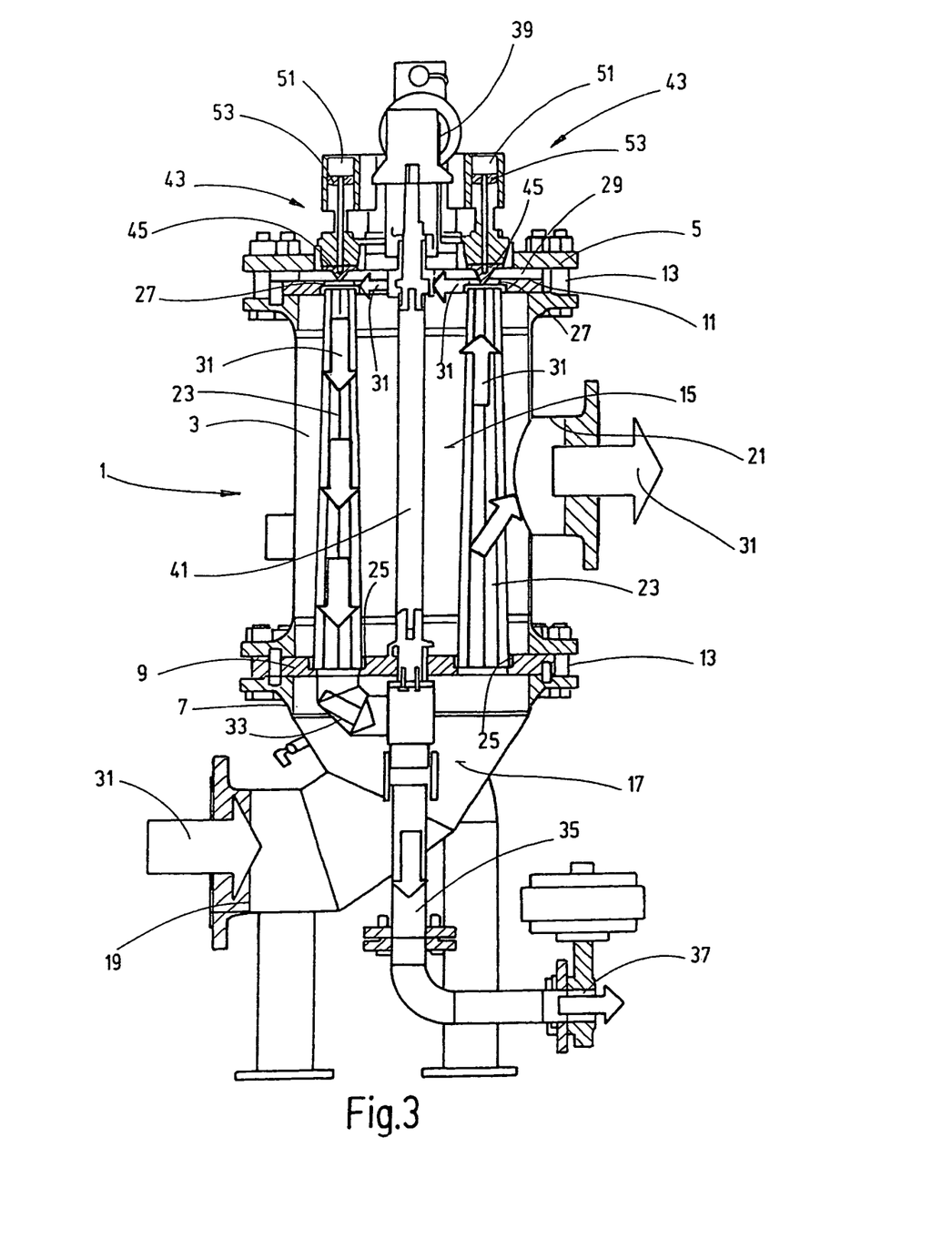
FIG. 3 is a schematic side view in section of the filter device of FIG. 1, wherein the flow pattern before carrying out the backwash of a selected filter element is shown.
Figure 4:
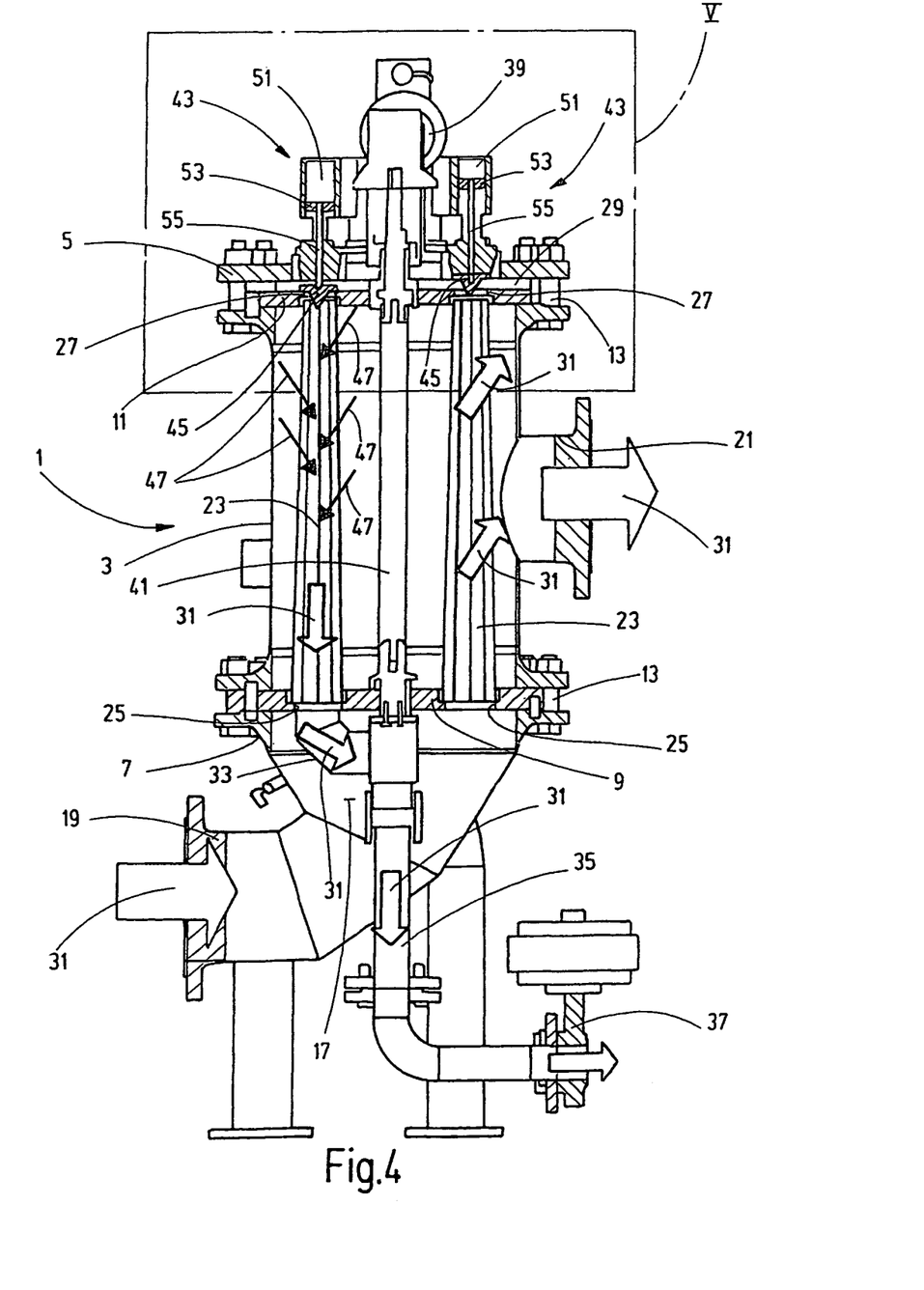
FIG. 4 is a schematic, side view in section of the filter device of FIG. 1, wherein the flow pattern during the backwash of a selected filter element is shown.
Figure 5:
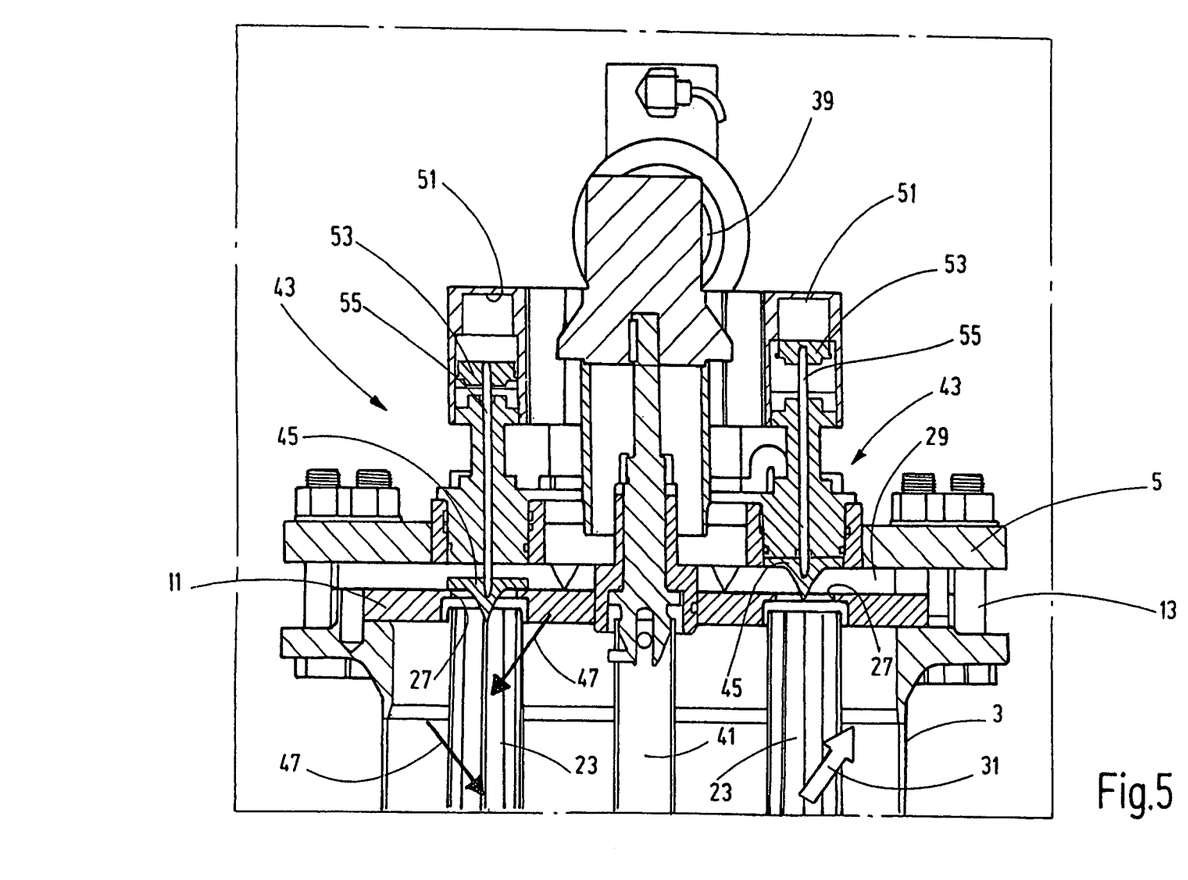
FIG. 5 is an enlarged, partial side view in section of the filter device of FIG. 1 of only the region designated as V in FIG. 4.

FIGS. 3 to 5 show the corresponding sequence of functions. In the present example, the pressure control mechanism has a pneumatically actuated cut-off valve 43 as a pressure control element, which has a movable valve body 45 that controls the aperture of the respective element opening 27 of the corresponding filter element 23 can be controlled. In the present example, the valve body 45, in combination with the edge of the element opening 27 on the cover plate 11, forms a kind of disc valve. Closing the cut-off valve 43 effects an abrupt interruption in flow and a suction effect in the manner of a pressure surge that is thereby generated. Instead of an abrupt and/or complete shutting of the valve, a desired slowing of the flow rate can be achieved by not completely stopping, but rather by throttling the flow.

As already mentioned, FIGS. 1 and 2 show filtration during operation. As shown most clearly in FIG. 2, the element openings 27 on all of the filter elements 23 are open.

Accordingly, the valve bodies 45 of the cut-off valves 43, with each element opening 27 being allocated to its own cut-off valve 43, are in the raised position, as shown in FIGS. 1 and 2. To initiate a backwash operation, the cut-off valve 43 on the element opening 27 of the selected filter element 23 is closed, the backwash arm 33 is aligned with the through passage 25 of the selected filter element 23 on the intermediate bottom 9, and the backwash line 35 is released by the valve mechanism 37. Briefly opening the cut-off valve 43 on the selected filter element 23 creates a flow of unfiltrate from the connecting chamber 29 through the filter cavity to the backwash line 35. This operational state is shown in FIG. 3. FIGS. 4 and 5 show the status of the interruption of flow according to the previous, brief opening of the cut-off valve 43. This interruption results in a suction effect for filtrate flowing in from the housing space 15, as the flow arrows 47 with solid lines show. Thus, not only is the pressure prevailing on the clean side available for the backwash, but an increased pressure gradient is also available for cleaning at the filter element 23. Even stubborn contamination can then be cleaned and discharged by the backwash line 35 when the valve mechanism 37 is opened.

In the embodiment of FIGS. 1 to 5, the element openings 27 for each filter element 23 are assigned to a separate cut-off valve 43 as a pressure control mechanism. The pneumatically activated cut-off valves 43 each have a pneumatic cylinder 51 and a piston 53 movable by a piston rod 55, for the associated valve body 45.

Figure 6:
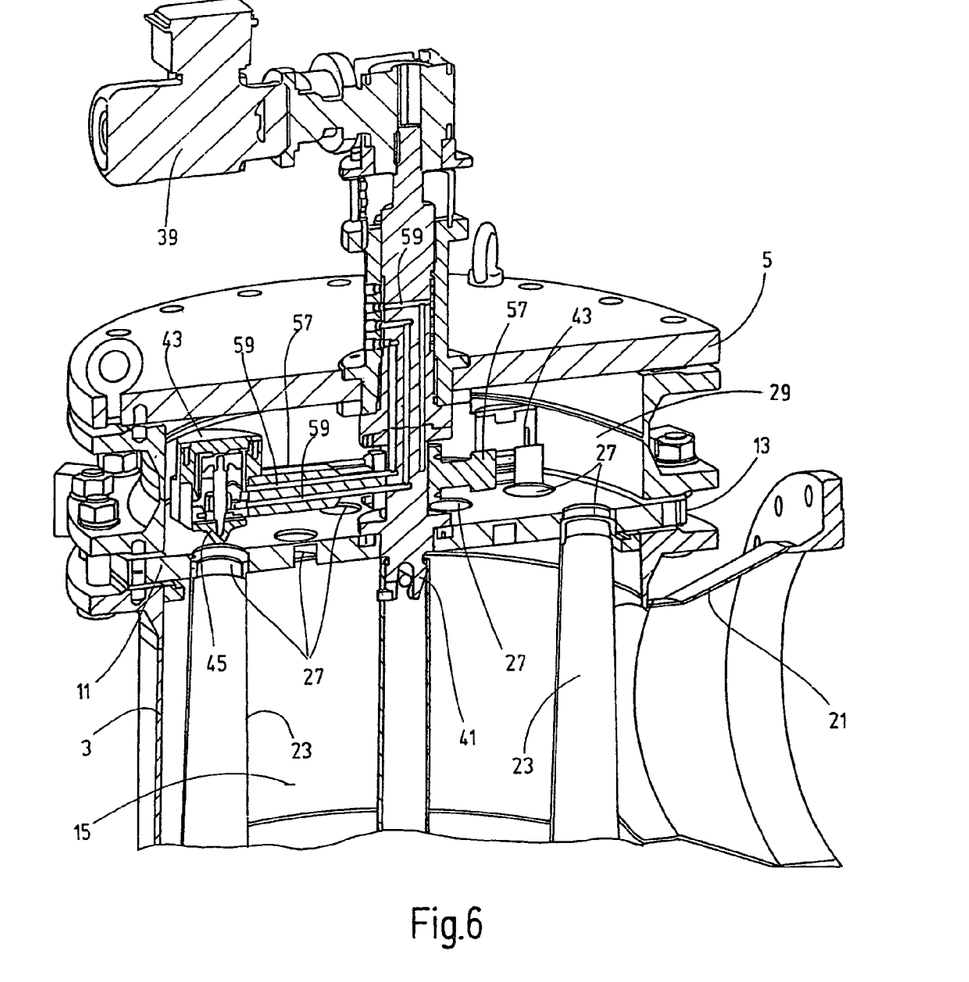
FIG. 6 is a partial, prospective view in section of the upper part of a filter device according to a second exemplary embodiment of the invention, in approximately the same scale as FIG. 5.

In the embodiment in FIG. 6, filter elements 23 are disposed along two concentric arcs, so that two circles of holes are located in the cover plate 11, which holes form the element openings 27 of the connecting chamber 29. FIG. 6 only shows two of the filter elements 23 assigned to the outer circle of holes. An additional difference as compared to the example described above is that each circle of holes is assigned to only one cut-off valve 43. Each of these pneumatically actuated valves 43 is located on a valve arm 57. Valve arm 57 is rotated by the drive motor 39, together with the backwash arm 33. The control and actuation is done by pneumatic lines 59. A backwash arm 33 is provided for each row of filter elements 23, which are not visible in FIG. 6. Aside from these differences, the functioning corresponds to that of the example described above.

Figure 7:
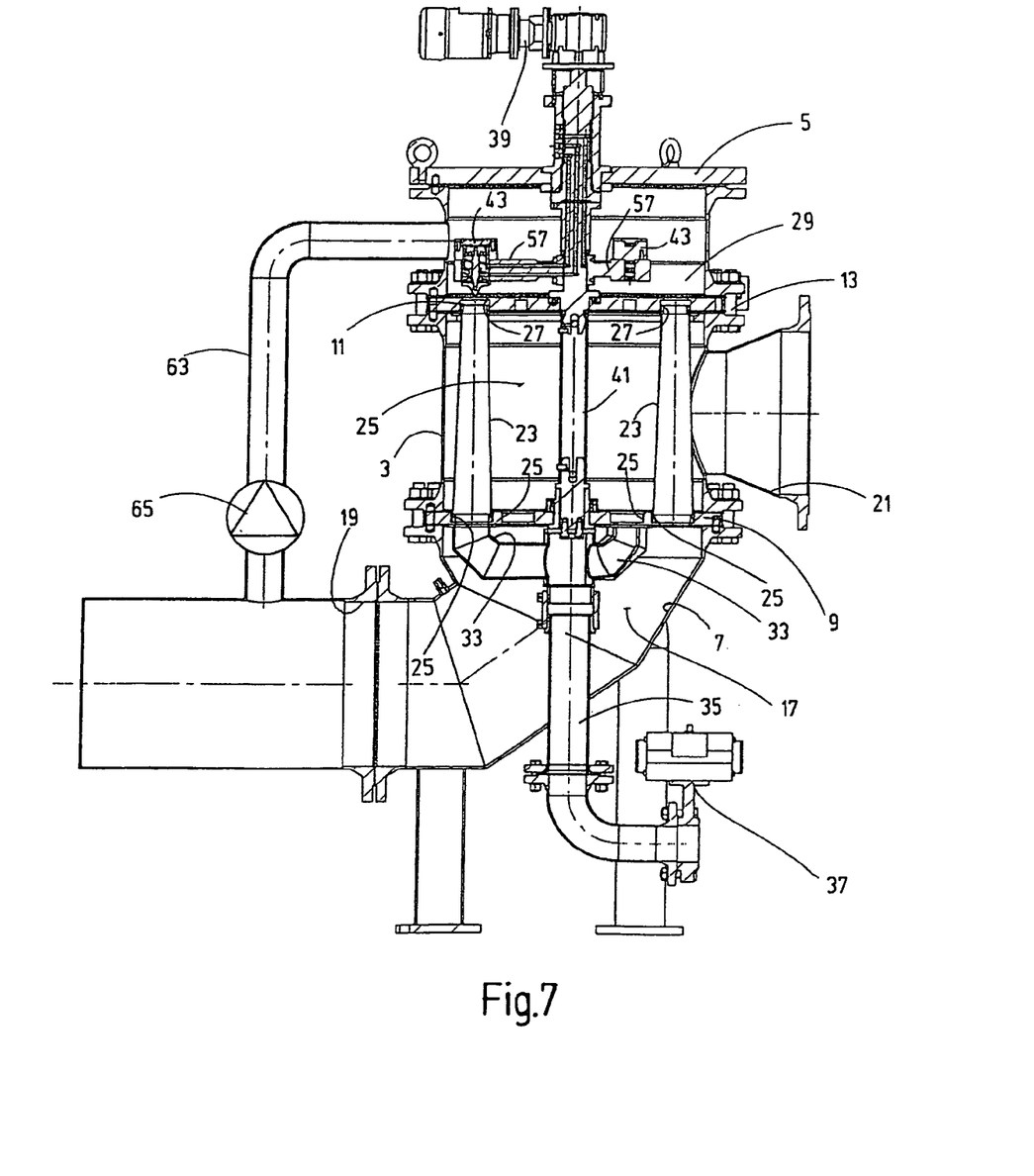
FIG. 7 is a side view in section of a filter device, in a scale that is smaller than in the preceding FIG. 6, of a third exemplary embodiment of the invention.

FIG. 7 shows a further embodiment, which only differs from the example in FIG. 6 in that the fluid pathway, by which unfiltrate flows into the connecting chamber 29 during filtration, is not created exclusively by element openings 27 in the connecting chamber 29 and out of the inner filter cavity of the filter elements 23. In addition, a connection between the filter inlet 19 and the connecting chamber 29 is provided as a fluid pathway, forming a bypass. In the illustration in FIG. 7, an external bypass line 63 is provided for this purpose and extends along the outside of the housing. A pump 65 is also disposed in bypass line 63 to support the flow.

Instead of an external bypass line 63, at least one branch line could be provided within the housing body 3 between the lower inflow space 17 and the connecting chamber 29, which is not shown in the Figure.

While in the examples in FIGS. 6 and 7, each hole of circles having element openings 27 is assigned to a single cut-off valve 43 on a valve arm 57, a stationary cut-off valve 43 could be provided at each element opening 27. The pivotable valve arms 57 could move these stationary cut-off valves 43 mechanically against a closing force into an open position in the event of an overflow. Further, instead of the pneumatic actuation that is shown, other kinds of valve actuators could be provided, for example, hydraulic or electric valve actuators.

While various embodiments have been chosen to illustrate the invention, it will be understood by those skilled in the art that various changes and modifications can be made therein without departing from the scope of the invention as defined in the claims.

The invention claimed is:

1. A filter device, comprising:
a filter housing having a filter inlet for fluid that to be filtered and a filter outlet for filtered fluid;
a plurality of filter elements received in said filter housing and arranged along two concentric arcs, each said filter element allowing fluid flow therethrough in opposite first and second directions for filtration and backwashing, respectively, at least one other of said filter elements being able to filter the fluid to be filtered while at least one of said filter elements simultaneously being able to be backwashed, each said filter element having an open end of a filter cavity therein with said filter cavity thereof forming an unfiltered side of the respective filter element;

a backwasher able to backwash said filter elements selectively and including a pressure control supporting backwashing of said filter elements, said pressure control having pneumatically operated first and second cut-off valves controlled and actuated by pneumatic lines and controlling fluid flow in fluid connections between said filter inlet and said filter elements being backwashed, said fluid connections including a connection chamber having a cover plate with first and second circles of element openings therein, each of said element openings being connectable to said open end of the respective filter cavity, said first and second cut-off valves being mounted on first and second control arms rotatable with first and second backwash arms together by a drive motor for engagement with said first and second circles of element openings, respectively; and a fluid pathway coupled in fluid communication with said connection chamber and said filter inlet during filtering such that unfiltrate flows into said connection chamber, said cut-off valves of said pressure control controlling flow of the unfiltrate through said element openings of the respective filter elements being backwashed.

2. A filter device according to claim 1 wherein
said element openings form parts of said fluid pathway for inflow of the unfiltrate into said connecting chamber.

3. A filter device according to claim 1 wherein
said fluid pathway comprises a bypass line connecting said filter inlet and said connecting chamber in fluid communication.

4. A filter device according to claim 3 wherein
a pump is connected to said bypass line to boost inflow of the unfiltrate into said connecting chamber.

5. A filter device according to claim 1 wherein
said cut-off valves allow abrupt blocking processes.

6. A filter device according to claim 1 wherein
said filter elements comprises filter cartridges being disposed vertically in said filter housing, having upper open ends of said filter cavities thereof connectable to said element openings of said connecting chamber during filtration and having open lower ends adjoining an inflow space, said inflow space opening into said filter inlet to supply the unfiltrate.

7. A filter device according to claim 6 wherein
said open lower ends of said filter cartridges are connectable to a backwash line during backwashing to discharge fluid contaminated during backwashing.

8. A filter device according to claim 7 wherein
said backwash line has a backwash valve selectively blocking and releasing said backwash line.

* * * * *